United States Patent [19]

Gardner

[11] Patent Number: 4,819,639
[45] Date of Patent: Apr. 11, 1989

[54] EAR TAG APPLICATOR

[75] Inventor: Michael S. Gardner, Auckland, New Zealand

[73] Assignee: Tagland New Zealand Limited, Remuera, New Zealand

[21] Appl. No.: 76,616

[22] Filed: Jul. 23, 1987

[30] Foreign Application Priority Data

Jul. 25, 1986 [NZ] New Zealand ............. 216968

[51] Int. Cl.$^4$ ............................................. A61B 17/00
[52] U.S. Cl. ........................................ 128/330; 227/144
[58] Field of Search .................. 128/330, 316, 329 R; 227/144, 140, 67

[56] References Cited

U.S. PATENT DOCUMENTS

| 1,444,290 | 2/1923 | Westby | 227/144 |
| 3,812,859 | 5/1974 | Murphy et al. | 128/330 |
| 4,120,303 | 10/1978 | Villa-Massone et al. | 128/330 |
| 4,201,214 | 5/1980 | Whiteley | 128/330 |
| 4,402,320 | 9/1983 | Filmer | 128/330 |
| 4,552,147 | 11/1985 | Gardner | 128/330 |

Primary Examiner—Stephen C. Pellegrino
Assistant Examiner—Colleen M. Reilly
Attorney, Agent, or Firm—Ladas & Parry

[57] ABSTRACT

An applicator of the present invention generally comprises too pivotally connected handle members, extending into upper and lower jaws. The lower jaw includes a lip, the lower jaw and lip defining a space into which an animals ear is located. The lower jaw further includes a recess, with a pivotal bar extending thereacross. In use, an eartag is positioned on a pivotally mounted pin. The handles are brought together, bringing the pin and tag passed the lip portion, through the ear of the animal (forming a cut therein) and through the recess described above. The pivotal bar stops or at least reduces movement of the ear into the recess, which has previously resulted in too large a cut being formed in the ear, and which has made the tag more difficult to apply.

5 Claims, 1 Drawing Sheet

EAR TAG APPLICATOR

BACKGROUND OF THE PRESENT INVENTION

This invention relates to an applicator for ear tags to be applied to livestock such as sheep, cattle and the like.

In describing this invention, reference is made particularly, but not exclusively, to the specification of U.S. Pat. No. 4,552,147. U.S. Pat. No. 4,552,147 discloses an applicator suitable for applying ear tags to livestock, and in particular to an applicator suitable for use in applying unitary or one piece ear tags to livestock such as sheep, cattle and the like.

The applicator disclosed in the abovementioned United States Patent Specification includes two pivotally connected handle members, extending in to upper and lower jaws. An elongate pin is pivotally connected adjacent one of the upper jaw. The lower jaw is provided with an integrally formed lip member, the lower jaw and the lip member together defining a space within which, for example, an animal's ear may be located during use. The lower jaw is further provided with a recess therein, the purpose of which will be described hereinafter.

During use, an ear tag to be applied is releasably attached to the pivotally mounted pin. An ear of an animal to be tagged is located within the space formed between the lower jaw and the lip member. The handles are then brought together. In this manner, the jaws are brought together, bringing the pin and attached tag passed the lip portion, through the ear of the animal, thus forming a cut therein, and through the recess described above. The pin is then able to move out of the cut and freely pivot away from the lower jaw and the ear.

The applicator of U.S. Pat. No. 4,552,147 is particularly suited to the application of unitary or one piece ear tags of the type which comprise a body portion and a head portion connected by a substantially thinner neck portion.

As described above, when such tags are being applied the tip or end of the pin makes a cut through the ear of the animal. This cut must be large enough to accommodate the neck portion of, for example, the tag described above, and in U.S. Pat. No. 4,552,147. In order for the neck portion to be located through the cut, the head portion of the tag must pass through the cut.

This is generally achieved in the following way. During application, at least the side or edge portions of the head of the tag are at least partially folded over, resulting in the head being of lesser width, thus facilitating movement of the head of the tag through the cut in the ear. However, at least one problem has been encountered during such operations. Due to the width of the recess provided in the lower jaw, the side or edge portions of the head portion of the tag tend not to fold over to the extent which is desirable. The ear of the animal generally folds or moves into the recess of the applicator, making movement of the head of the tag through the ear difficult. Furthermore, a larger cut than necessary is sometimes made in the ear, as the head portion of the tag passes therethrough.

While this effect does not detract from the overall efficiency of the applicator disclosed for example in U.S. Pat. No. 4,552,147 improvement is always desirable and to this end the subject application relates to developments in applicators for use in the application of ear tags to livestock.

It is to be noted that the arrangement of U.S. Pat. No. 4,552,147 has enjoyed considerable success, and the applicator of the subject specification is in no way intended to detract from the merits thereof.

This specification provides an applicator which is a useful alternative.

In addition, it should be noted that while the present invention has particular application to an arrangement such as that described and claimed in U.S. Pat. No. 4,552,147, it is no way intended to be limited thereto. Generally, the invention of the subject application would be applicable to various arrangements suitable for use in the application of ear tags to livestock. Such applicators would generally include at least a first jaw member with a recess in the forward portion thereof, and a pin attached or connected to a second member, the pin adapted to move toward and through the recess provided in the first jaw member, during use, and adapted to thereafter pivot out of the recess and away from at the first jaw member. For example, the arrangement disclosed in U.S. Pat. No. 4,201,214 includes an applicator for applying ear tags to animals, wherein there is provided a pin which is adapted to move downwardly through the ear of the animal, and is adapted to thereafter pivot through an arc and move away from the ear of the animal. The lower jaw of the applicator is provided with a recess in one end thereof. Similarly, the applicator disclosed in Australian Patent Specification No. 56178/80 is suitable for the application of one piece or unitary ear tag. The specification discloses an arrangement including a pin which is capable of pivoting away from the applicator and away from the ear of the animal, once it has passed through the ear of the animal and the tag has been applied. The applicator is also provided with a recess in one jaw thereof, through which the pin moves during application, and out of which the pin pivots after application. It will be appreciated from further description given hereinafter that the invention of this application has application to a variety of applicators.

It is an object therefore of one aspect of the present invention to provide an applicator for use in the application of ear tags to livestock, which goes at least some way to overcoming the abovementioned problems, or which at least provides the public with the useful alternative.

BRIEF SUMMARY OF THE INVENTION

According to one aspect of the present invention there is provided an applicator for use in the application of ear tags to livestock, including at least two main members, attached or connected one with the other; each of said main members comprising at least one handle member extending into or being attached to at least one jaw, a first of said jaws being provided with an elongate pin pivotally connected or attached adjacent one end thereof, and a second of said jaws inlcuding a forward portion with an elongate recess or opening therein and a pivotal bar capable of extending across said recess or opening; so as to define a restricted recess or opening through which said pin may move said pivotal bar being adapted to pivot away from said recess or opening so as to allow said pin to pivot freely out of and away from said recess or opening.

According to a further aspect of this present invention there is provided an applicator for use in the application of ear tags to livestock, including at least two handle members connected one with the other, said handle members extending into or being attached to first and second jaws; wherein an elongate pin is connected adjacent one end of said first jaw; and wherein said second jaw includes a forward portion with an elongate recess or opening therein and a pivotal bar capable of extending across said recess or opening so as to define a restricted recess or opening; through which said pin may move the arrangement being such that in a first position said pivotal bar extends across said recess or opening, and at least a second position said pivotal bar is positioned so as to leave said recess or opening unrestricted.

BRIEF DESCRIPTION OF THE ACCOMPANYING DRAWINGS

The invention will now be described by way of example only, and with reference to the accompanying drawings wherein:

FIG. 1: Shows a plan view of a forward end of a second jaw member according to one aspect of the present invention.

FIG. 2: Shows a side view of the forward portion of the second jaw member shown in FIG. 1.

FIG. 3: Shows a side view of an applicator according to one preferred form of the present invention.

FIG. 4: Shows an underside view of the forward portion of the applicator shown in FIG. 3.

DETAILED DESCRIPTION OF THE PREFERRED EMBODIMENT OF THE PRESENT INVENTION

Figure 1:
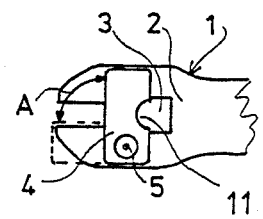

Referring now to the accompanying drawings, there is provided in one preferred form of the invention an applicator which includes a jaw member 1.

The jaw member 1 includes a forward portion 2. The forward portion 2 is provided with an elongate recess or opening 3 in the distal end thereof, as shown in FIG. 1.

The forward portion 2 is further provided with a pivotal bar 4. The pivotal bar 4 is preferably attached to the forward portion 2, on at least one side of said elongate recess or opening 3. The pivotal bar 4 is attached to the forward portion 2 by any suitable or appropriate means. In one form of the invention, as shown in the accompanying drawings, the pivotal bar 4 is attached by use of a spring-biased screw arrangement 5, 6.

The spring-biased screw arrangement 5, 6 maintains the pivotal bar 4 in its normal position, the normal position of the pivotal bar 4 being such that the pivotal bar 4 extends across the recess or opening 3, thus providing a restricted recess 3 as shown in FIG. 1. However, the provision of the spring-biased screw arrangement 5, 6 allows for the pivotal bar 4 to be moved in the direction indicated by the arrow A as shown in FIG. 1 and the dotted lines in FIG. 2, when some appropriate force is applied thereto. Similarly, once the applied force has been removed, the spring-biased screw arrangement 5, 6 is such that the pivotal bar 4 returns to its normal position. This will be further described hereinafter.

Figure 3:
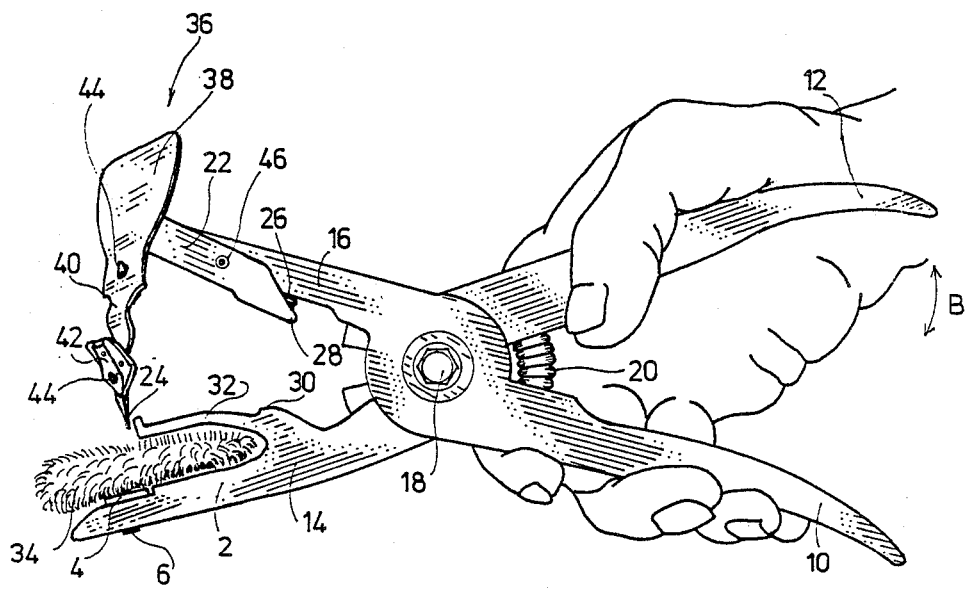
Figure 4:
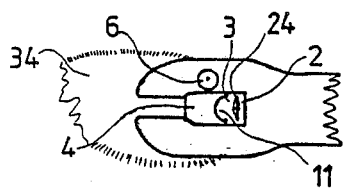

The invention of the subject application has particular application to applicators of the type described in U.S. Pat. No. 4,552,147. A similar applicator is shown in FIGS. 3 and 4, and further description of the invention will now be given with reference to these drawings. It will be appreciated, however, that the invention has application to other arrangements, such as for example those previously herein referred to.

As shown in FIG. 3, the applicator includes first and second handle members 10 and 12, which lead in to or are connected to elongate, spaced apart jaw members 14 and 16.

The handles and jaws are pivotally connected one with the other, by a suitable pivotal connection such as for example a bolt 18. Thus, the handles and jaws are capable of pivoting open and closed in a substantially 'pliers' like operation.

Spring means in the form of a spring 20 is provided between handles 10 and 12 and adjacent the pivotal connection 18. Thus, the spring 20 normally urges the handle members 10 and 12 and jaw members 14 and 16 away from each other. Thus, they are normally maintained in an open position, as shown in FIG. 3.

To close the jaw members 14 and 16, and thus operate the applicator, the handle members 10 and 12 are gripped and moved in the direction indicated by the arrow B shown in FIG. 3. Thus, the spring 20 is compressed against its normal bias, and the jaws 14 and 16 move toward one another. The upper jaw member 16 has attached hereto a pin mounting member 22. The pin mounting member 22 mounts an elongate pin 24, said pin 24 being provided with a sharpened distal end, capable of passing through any ear of an animal. There is also provided a pin restraining housing (not shown) which maintains the pin 24 in a fixed position, until the pin restraining housing is actuated, as will be further described hereinafter. Within the pin mounting member 22 there is provided a spring 26, mounted between the base member 28 of the pin mounting member 22 and a lower surface of the jaw member 16. The spring 26 is biased so as to urge the base 28 and pin mounting member 22 away from the lower surface of the jaw 16.

The outer end of the pin mounting member 22 is further provided with a housing which in the normal position retains the pin 24 in the position shown in FIG. 3.

As described above, the lower jaw member 14 is provided with an elongate recess or opening 3 therein, which is restricted by provision of the pivotal bar 4. The arrangement is such that when the pin 24 passes downwardly through the ear of an animal, it is also able to pass through the restricted recess 3.

The inner surface of the lower jaw member 14 is provided with a stepped actuating member 30, which forms an abutment member.

The lower jaw 14 may also be provided with an integrally formed lip member 32 extending outwardly from the abutment member and defining a space or slot within which an animal's ear 34 is located during use.

As described in U.S. Pat. No. 4,552,147, the invention has particular advantage when used in applying a substantially unitary one piece ear tag such as the tag 36, shown in FIG. 3. The tag 36 has a main body portion 38 which leads in to a neck portion 40. The neck portion 40 extends in to a head portion 42. The head 42 is preferably wider and extends outwardly from the neck 40. Suitable holes 44 are provided in the body portion and the head portion, and are adapted to engage over locating pins which extend outwardly from the outer surface of the pin 24. This allows the tag 36 to be located on the pin 24 in order that at least the head 42 of the tag 36 is able to pass through an ear of an animal, as will be described further hereinafter.

In one preferred form of the invention, the pivotal bar 4 is provided with an indent or recess 11 therein, which allows the pins which locate and retain the tag 36 (by means of the holes 44), may move through the recess 3 easily and efficiently. However, it should be appreciated that the indent or recess 11 is provided in one preferred form of the invention only.

As described above, the lower jaw 14 is further provided with a pivotal bar 4, attached by means of the spring biased screw arrangement 5, 6.

When it is desired to apply an ear tag 36 to an ear 34 of animal, the ear 34 is located in the position shown in FIG. 3. The tag 36 is attached to the pin 24 by location of the locating pins through the holes 44.

The handles 10 and 12 are gripped, as shown in FIG. 3, and brought together against the urging of the spring 20. This in turn brings the jaws 14 and 16 together and the pin 24 moves downwardly through the ear 34 of the animal, at the same time taking at least the heat portion 42 of the tag 36 through the ear.

Having passed through the ear of the animal, the pin 24 passes through the restricted recess or slot 3 in the jaw 14.

The closure of the jaws 14 and 16 brings the abutment surface of the actuating member 30 into contact with the lower surface 28 of the pin mounting member 22. This contact (and continued closure of the jaws 14 and 16), will cause the spring 26 to be compressed. This causes movement of the pin mounting member 22 about a pivot point 46 which allows the pin 24 to move out of engagement with the pin restraining housing (not shown) in order that the pin 24 will be free to pivot about its pivot point (not shown).

With previous arrangements, the force of the pin 24 on the ear 34 has tended to cause the ear 34 to be at least partially pushed or forced in to the recess or opening 3. In addition, due to the width of the recess or opening 3 the head 42 of the tag 36 which is to pass through the ear 34 tends to splay outwardly. The above combined to result in what is often a larger cut than necessary being formed in the ear 34, and the above often also make it difficult to locate the head 42 of the tag 36 through the ear 34.

Thus, the pivotal bar 4 has been provided and is preferably attached to one side of the recess or opening 3 on the forward portion 2 of the jaw 14. The pivotal bar 4 is maintained in its usual position, so as to extend across the recess or opening 3 by means of the spring-biased screw arrangement 5, 6. The pivotal bar 4 is, however, capable of pivoting in to a second position, on application of an appropriate force.

When a tag 36 is to be inserted, the pivotal bar 4 in its normal position, so as to extend across the recess or opening 3. This restricts the size of the recess or opening 3, and allows the head 42 of the tag 36 to be compressed more precisely within the further defined area without pushing or forcing the ear of the animal into the recess or opening 3.

The ear 34 is thus further supported, and it has been found that the pin 24 and the head 42 of the tag 36 pass neatly and efficiently through the ear 34, avoiding or minimising problems encountered up until this time.

It will be appreciated that once the pin 24 has moved through the ear 34, taking at least the head 42 of the ear tag 36 with it, and on the head 42 of the tag 36 being engaged on the reverse side of the ear, the pin 24 is free to move out of the cut formed in the ear of the animal and to pivot about its pivotal point (not shown) relative to the pin mounting member 22. Thus, it will be free to pivot outwardly and away from the applicator, and from the ear of the animal so as to release itself from the ear of the animal.

Figure 2:
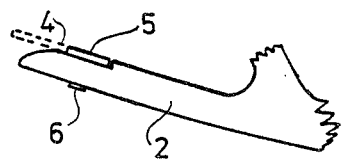

As the pin 24 pivots outwardly, once it has passed through the ear 34, the pin 24 applies a force to the pivotal bar 4, causing the pivotal bar 4 to pivot outwardly so as to leave the recess or opening 3 unrestricted or open (as shown by the dotted arrows in FIG. 2).

The movement of the pin 24 substantially outwardly, following insertion of the tag 36, causes the pivotal bar 4 to move outwardly and thus allows the removal of the pin 24 away from the ear 34.

Upon the force of the pin 24 no longer being applied to the pivotal bar 4, the pivotal bar 4 returns to its normal position across the recess or opening 3. This movement is caused by the provision of the spring-biased screw arrangement 5, 6, which maintains the pivotal bar 4 in its position across the recess or opening 3, unless a force is applied thereto. This enables the pivotal bar 4 to be held in position so that it does not move around unnecessarily while the tag is being inserted. On a positive force being applied thereto, however, the pivotal bar 4 may easily pivot away from and out of position to enable removal of the pin 24 from the vicinity of the ear. It is envisaged that the pivotal bar 4 may move in other directions, without departing from the scope of the invention. For example, it is envisaged that the pivotal bar 4 may move upwardly, in a direction toward the upper jaw 16, in a further form of the invention.

It is envisaged that the applicator of the present invention may be formed from any suitable material or materials and by any suitable technique or techniques. For example, it is envisaged that appropriate materials would include metal, hardened plastics and the like.

As discussed in U.S. Pat. No. 4,552,147, the arrangement has particular advantage should an animal pull or violently move its head during application. The arrangement overcomes the problems associated with fixed pins, and further provides a straightforward and efficient arrangement.

It should be understood that while the present invention has particular application to the arrangement such as that described and claimed in U.S. Pat. No. 4,552,147, it is no way intended to by limited thereto. It should be appreciated, therefore, that the invention has been described by way of example only, and is applicable to other arrangements suitable for the application of ear tags to livestock.

It should be appreciated that the provision of a pivotal bar according to the present invention restricts the recess into which an ear of an animal might otherwise be forced or pushed, upon application of the pin of the applicator. This facilitates an improved application of the tag, as the slit cut in the ear is smaller than has previously been possible.

Thus, there is provided by the present invention an applicator adapted for use in the application of ear tags to livestock at the like which is efficient in use and overcomes at least some of the problems associated with previously available arrangements.

It should be appreciated that modifications and improvements may be made to the invention without departing from the scope of spirit thereof, as defined in the appended claims.

We claim:

1. An applicator for use in the application of ear tags to livestock, including at least two main members connected one with the other, each of said main members comprising at least one handle member extending into or being attached to at least one jaw, a first of said jaws being provided with an elongate pin pivotally connected or attached adjacent one end thereof, and a second of said jaws including a forward portion with an elongate recess or opening therein, and a pivotal bar, capable of extending across said recess or opening, so as to define a restricted recess or opening, through which said pin may move, said pivotal bar being adapted to pivot away from said recess or opening so as to allow said pin to pivot freely out of and away from said recess or opening.

2. An applicator for use in the application of ear tags to livestock, including at least two handle members connected one with the other, said handle members extending into or being attached to first and second jaws; wherein an elongate pin is connected adjacent one end of said first jaw; and wherein said second jaw includes a forward portion with an elongate recess or opening therein and a pivotal bar capable of extending across said recess or opening, so as to define a restricted recess or opening through which said pin may move; the arrangement being such that in a first position said pivotal bar extends across said recess or opening, and at least a second position said pivotal bar is positioned so as to leave said recess or opening unrestricted.

3. An applicator as claimed in claim 1 or claim 2 wherein said pivotal bar is attached or connected to said jaw member by use of a spring-biased screw arrangement.

4. An applicator as claimed in claim 1 or claim 2, wherein said pivotal bar is provided with at least one indent in at least one side thereof.

5. A method of applying an ear tag to an ear of an animal, including the step of:
  (a) attaching or engaging an ear tag to a pivotal pin provided on an ear tag applicator, which includes two main members connected one with the other, each of said main members comprising at least one handle member extending into or being attached to at least one jaw, a first of said jaws being provided with said pin adjacent one end thereof, and a second of said jaws including a forward portion with an elongate recess therein, and a pivotal bar capable of extending across said recess or opening so as to define a restricted recess or opening through which said pin may move;
  (b) placing an ear of an animal adjacent said second jaw and between said recess of said second jaw and said first jaw;
  (c) moving said handle members toward one another, so as to move said pin toward and through said ear and through said recess or opening;
  (d) thereafter releasing said handle members, such that said pin moves out of a cut formed in said ear, and outwardly of said recess, by pivoting said pivotal bar out of and away from said recess or opening, so as to leave it unrestricted.

* * * * *